US009898704B2

(12) United States Patent
Rasch et al.

(10) Patent No.: US 9,898,704 B2
(45) Date of Patent: Feb. 20, 2018

(54) FORECAST MONITOR TO TRACK TRANSPORT SUPPLY IN DEVELOPMENT ENVIRONMENTS

(71) Applicants: Tobias Rasch, Wiesloch (DE); Andreas Meier, Heidelberg (DE)

(72) Inventors: Tobias Rasch, Wiesloch (DE); Andreas Meier, Heidelberg (DE)

(73) Assignee: SAP SE, Walldorf (DE)

( * ) Notice: Subject to any disclaimer, the term of this patent is extended or adjusted under 35 U.S.C. 154(b) by 415 days.

(21) Appl. No.: 13/936,765

(22) Filed: Jul. 8, 2013

(65) Prior Publication Data
US 2015/0012906 A1 Jan. 8, 2015

(51) Int. Cl.
G06F 9/44 (2006.01)
G06Q 10/06 (2012.01)

(52) U.S. Cl.
CPC .................. G06Q 10/063 (2013.01)

(58) Field of Classification Search
None
See application file for complete search history.

(56) References Cited

U.S. PATENT DOCUMENTS

| 7,721,257 | B2 | 5/2010 | Demuth et al. |
| 7,725,891 | B2 | 5/2010 | Demuth et al. |
| 7,926,056 | B2 | 4/2011 | Lier et al. |
| 8,321,856 | B2 | 11/2012 | Auer et al. |
| 8,327,351 | B2 | 12/2012 | Paladino et al. |
| 8,332,462 | B2 | 12/2012 | Kruempelmann |
| 8,370,272 | B2 | 2/2013 | Wickel et al. |
| 8,584,100 | B2 | 11/2013 | Xu et al. |
| 8,839,035 | B1 * | 9/2014 | Dimitrovich ....... G06F 11/3688 714/25 |
| 2006/0123392 | A1 | 6/2006 | Demuth et al. |
| 2006/0155832 | A1 | 7/2006 | Demuth et al. |
| 2007/0149036 | A1 | 6/2007 | Misovski |
| 2010/0100874 | A1 * | 4/2010 | Narayanan ......... G06F 11/3688 717/131 |
| 2011/0158242 | A1 | 6/2011 | Auer et al. |
| 2012/0166405 | A1 | 6/2012 | Barbian et al. |
| 2012/0331447 | A1 | 12/2012 | Nayak et al. |
| 2013/0104105 | A1 * | 4/2013 | Brown ................ G06F 11/3684 717/124 |
| 2013/0117700 | A1 | 5/2013 | Meier et al. |
| 2014/0325476 | A1 * | 10/2014 | Sayers ..................... G06F 8/70 717/115 |

* cited by examiner

Primary Examiner — Lewis A Bullock, Jr.
Assistant Examiner — Melissa Alfred
(74) Attorney, Agent, or Firm — Fountainhead Law Group P.C.

(57) ABSTRACT

Systems and method for forecasting release times in a multisystem software development environment are disclosed. A forecast engine may analyze the system specific data for multiple systems in a particular transport chain of systems in the development environment to determine when object code should be released from a source system to reach a target system in time to be included in an event, such as a software build or quality assurance test. The system specific data may include event schedules for each system in the transport chain. By analyzing the system specific data and the transport chain, the forecast engine can generate a time by which object code needs to be released to traverse the transport chain so that it is available to the target system for a particular scheduled event.

20 Claims, 6 Drawing Sheets

FORECAST MONITOR TO TRACK TRANSPORT SUPPLY IN DEVELOPMENT ENVIRONMENTS

BACKGROUND

Unless otherwise indicated herein, the approaches described in this section are not prior art to the claims in this application and are not admitted to be prior art by inclusion in this section.

The present invention relates to multisystem software development environments that include multiple physical and virtual computing systems. The system are accessible by multiple users (i.e., developers) and include functionality and tools to complete various software development tasks in a coordinated manner to generate one or more software applications or systems. FIG. 1 illustrates a representative sample of the systems of an example multisystem software development environment 100. Using development system 100, the efforts of multiple individual and teams of developers can use the functionality of the individual systems in concert to develop and deliver software applications and systems. Using systems like software development environment 100, a software development project can be split into multiple tasks and delegated to various developers. Accordingly, each of the various tasks may be considered a subproject of the overall software development project.

The systems within development environment 100 may be categorized by its functionality or the particular subproject for which it is used. For example, the development environment 100 may include software authoring or development systems 110 for generating various code segments and object code, testing systems 130 for testing individual and composite code segments and object code, and transport hubs 120 for coordinating the transport and distribution of code segments and object code among the systems. As used herein, the terms code segment and object code can be used interchangeably to refer to any human or computer readable code generated, tested, or handled, by any of the systems in a development environment 100.

As object code is completed, compiled, or tested, the originating system may release the object code by generating a transport request. In such systems, the transport request may include a transport file that includes the object code and/or metadata about the object code. For instance, the metadata may include indications of changes in the object code. Accordingly, the transport file may include complete objects codes, or it may include only indications of changes in the object code generated by the source system. When the transport file is released, the source system can make it available to other systems for import. In some conventional systems, the transport hubs 120 may include queues into which released object codes can be stored until one or more target systems are ready or scheduled to import them.

Multisystem development environments are particularly useful for coordinating the effort of multiple developers and systems. Object code from multiple developers and systems can be combined into composite objects. When a composite object is compiled, it can be transported, tested, and included in further development as a unit. Since compilation, testing, or demonstration of a composite object is dependent on component object codes being available, before a particular composite object can be released for transport, the compiling system must receive the component object codes in time to be processed.

To coordinate the composition and testing of composite object code, the individual systems in the multisystem development environment 100 may be configured to execute various tasks according to particular schedules. For example, development environment 100 may include a transport chain 105 including a group of connected systems for compiling one or more particular composite objects. For example, development system 110-1 may provide object code for a user interface (UI) that can be combined with backend analysis code generated by development systems 110-2 and 110-3. In transport chain 105, test system 130-7 (e.g., a quality assurance test system) may be configured to import object code from multiple development systems 110-1, 110-2, and 110-3 through transport hubs 120-1, 120-2 and 120-3 to compile and test a composite object comprising the component object code. Each system in transport chain 105 may perform its various tasks (e.g., release, import, compilation, testing, etc.) according to its own schedule before releasing object code or importing object code from another system. Accordingly, it may take some time for object code released from development system 110-1 to be available to test system 130-7. Because each system may determine or alter its own task schedule, it difficult for a user to know for certain how long it might take for his or her object code to reach a particular target system once it is released from a particular source system. This uncertainty is problematic when it comes to determining actual cut off dates/times for releasing object code that a developer wishes to, or is required to, include in a scheduled event, (e.g., a test routine, software build, or customer demonstration). Currently there is no way for an individual developer or team of developers to know exactly how long it will take for their object code to reach a particular target system in which the event will take place according to a particular schedule (e.g., a weekly importation schedule or an annual demonstration to a review group of users). Embodiments of the present invention provide systems and methods for determining the release time for object code to be included in the next possible or particular event.

SUMMARY

Embodiments of the present invention include systems and methods for improving the efficacy, speed, and ease of use of multisystem software development environments, such as the Advanced Business Application Programming (ABAP) that run in one or more business systems (e.g., installations of Web Application Server) available from SAP AG.

One embodiments of the present disclosure includes a computer implemented method that includes receiving a request for event schedule data for a software development environment comprising a plurality of systems, retrieving system-specific data for the plurality of systems based on the request, and determining a source system in the plurality systems and a target system in the plurality of systems based on the request. The source system may include a development system from which object code is released and the target system includes another system in the plurality of systems. Such methods may include retrieving a transport layer definition based on the system-specific data. The transport layer definition describes how object code is processed by the plurality of systems in the software development environment. In such embodiments, processing object code may include distributing the object code along the transport chain. The method may also include determining a transport chain for transporting object code among the plurality of systems from the source system to the target system based on the transport layer definition, and generating a time designation for releasing object code from the source system based on the request and the transport chain.

In one embodiment, the plurality of systems comprise a plurality of transport hub systems for coordinating the transport of object code among the plurality of systems, and wherein determining the transport chain comprises determining a plurality of object release schedules that define to which other systems in the plurality of systems and when corresponding transport hub systems release object code.

In one embodiment, the plurality of systems comprise a plurality of test systems for testing the functionality of object code, and wherein determining the transport chain comprises determining a plurality of testing schedules that define when corresponding test systems test object code.

In one embodiment, determining the transport chain comprises determining blocking periods during which corresponding systems block transporting object data from other systems in plurality of systems.

In one embodiment, the request for event schedule data comprises a target event in the target system, and wherein determining the transport chain comprises determining the latest possible release time of object code from the source system for the object code to reach the target system in time for the target event.

In one embodiment, determining the transport chain comprises determining the latest possible release time of object code from the source system for the object code to reach the target system in time for a scheduled event in the target system.

In one embodiment, the target system comprises a testing system and the scheduled event comprises a testing routine.

Another embodiment of the present disclosure includes a non-transitory computer readable medium that includes computer readable instructions, that when executed by a computer processor, cause the computer processor to be configured for receiving a request for event schedule data for a software development environment comprising a plurality of systems, and retrieving system-specific data for the plurality of systems based on the request determining a source system in the plurality systems and a target system in the plurality of systems based on the request. The source system may include a development system from which object code is released and the target system comprises another system in the plurality of systems. In some embodiments, the instructions further cause the processor to be configured for determining a transport layer definition based on the system-specific data. The transport layer definition describes how object code is processed by the plurality of systems in the software development environment. In such embodiments, processing object code may include distributing the object code along the transport chain. The instructions further cause the processor to be configured for determining a transport chain for transporting object code among the plurality of systems from the source system to the target system based on the transport layer definition, and generating a time designation for releasing object code from the source system based on the request and the transport chain.

Another embodiment of the present disclosure includes a system that includes a computer processor and a non-transitory computer readable medium coupled to the processor and comprising instructions, that when executed by the computer processor cause the computer processor to be configured to receive a request for event schedule data for a software development environment comprising a plurality of systems, retrieve system-specific data for the plurality of systems based on the request, determine a source system in the plurality systems and a target system in the plurality of systems based on the request. The source system may include a development system from which object code is released and the target system may include another system in the plurality of systems. The instructions further cause the processor to be configured to determine a transport layer definition based on the system-specific data, wherein the transport layer definition describes how object code is processed by the plurality of systems in the software development environment, determine a transport chain for transporting object code among the plurality of systems from the source system to the target system based on the transport layer definition, and generate a time designation for releasing object code from the source system based on the request and the transport chain. In such embodiments, processing object code may include distributing the object code along the transport chain.

The following detailed description and accompanying drawings provide a better understanding of the nature and advantages of the present invention.

DETAILED DESCRIPTION

Figure 1:
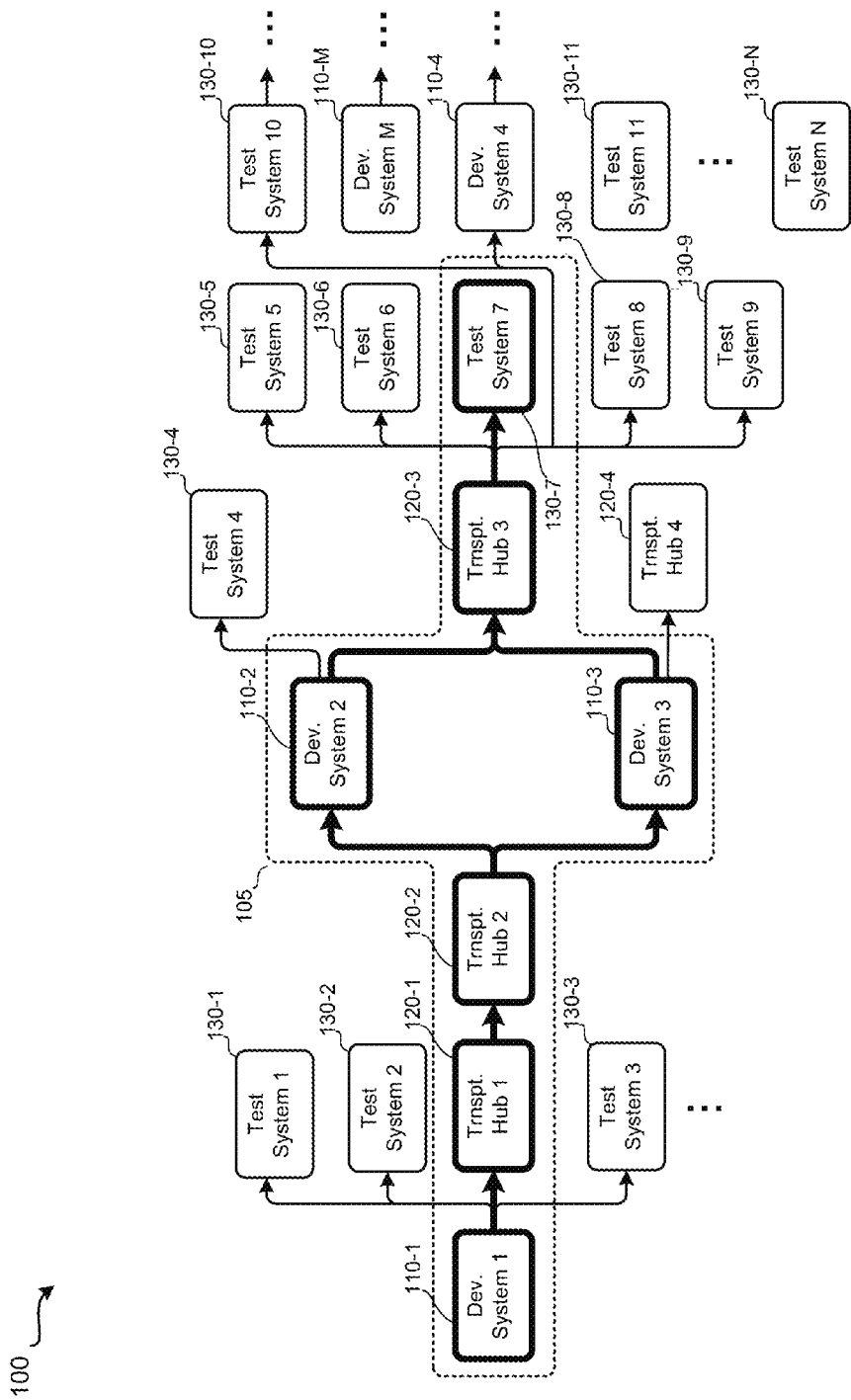
FIG. 1 is a block diagram of a multisystem software development environment that can be improved by various embodiments of the present disclosure.

Described herein are techniques for systems and methods for forecasting release times in a source system that ensure delivery of object code to a target system in a multisystem software development environment in time for a scheduled event. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Overview

Embodiments of the present disclosure include techniques for systems and methods for forecasting times/dates for releasing object code generated in a source system such that the object code can traverse a particular transport chain through multiple intermediate systems in time to be included in a scheduled event in a target system. Such embodiments include a forecast engine executed in a computer system coupled to a particular development environment. The forecast engine can receive information from a user, individual systems within the particular development environment, or a repository of collected event schedules to generate specific scheduling information the user can reference to inform his or her development efforts within the overall goals of the development environment. For instance, a user in charge of creating object code for a particular UI of an application may use a particular development system coupled to other systems in the development environment. In order to complete his or her portion of the application in time for it to be included in a demonstration scheduled for a particular time, the user needs to know by what time the UI object code needs to be released so that it has time to traverse the transport chain to arrive in a target system designated to compile the object code into a final or intermediate composite object or application according to a particular schedule. Based on the information in the request from the user, the forecast engine may determine a particular transport path for transporting the object from the source system to the target system. The transport path may include multiple development, transport, test, production, and other systems coupled together by various transport mechanisms, as defined by a particular transport layer definition associated with the particular development environment. The forecast engine may then determine system specific data for the systems in the transport chain. The system specific data may include schedules for events that occur in each of the systems. Such events may include scheduled start and stop times for imports, builds, or tests, and the associated blocking periods during which the scheduled events preclude a particular system from receiving or releasing data or object code.

By analyzing all of the system specific information for the systems in the particular transport chain, the forecast engine may determine the next scheduled event in the target system in which the user may wish his particular object code to be included and the time by which he would need to release his object code such that it reaches the target system in time. In another embodiment, the forecast engine may receive information regarding a particular scheduled event in the target system in which the user would like to have an object code included (e.g., a quality assurance day test or a customer demonstration). In such embodiments, the forecast engine may analyze all of the system specific information to generate an output report that includes the latest possible time by which the user must release his object code in order for it to traverse the transport chain in time to be included in the scheduled event.

Figure 2:
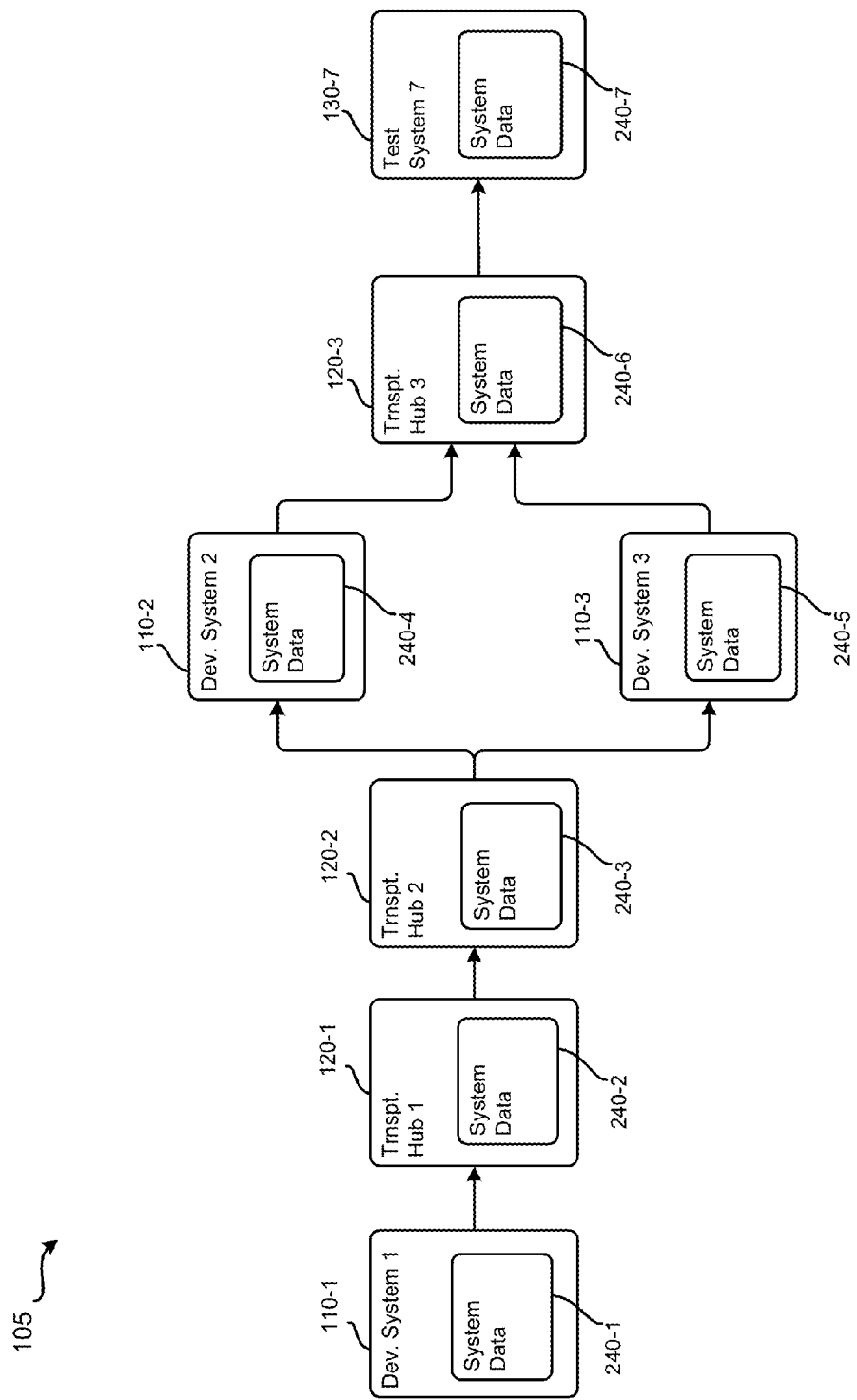
FIG. 2 is a block diagram of an example transport chain in a multisystem software development environment, according to various embodiments of the present disclosure.

FIG. 2 is a block diagram of the transport chain 105 included in the development environment 100 depicted in FIG. 1. As shown, the systems in the transport chain 105 are in linked by number of connections. The arrangement of the systems in the transport chain 105 is determined by a transport layer definition that describes the specific systems and the connections among those systems in the development environment. For example, development environment 100 may be associated with a specific transport layer definition that defines the ordered connections among the development systems 110, the transport hubs 120, and the test systems 130. In some embodiments, the transport chain 105 may be defined by the source system 110-1 and the target system 130-7. Based on the sources 110-1 and the target system 130-7, the forecast engine can analyze the transport layer definition associated with the development environment in which the two systems are disposed to determine the intermediate systems and connections that link them to one another. Once the forecast engine has determined a particular transport chain 105, it can retrieve system specific data 240 regarding each of the individual systems. As used herein, the term system specific data 240 refers to any and all information regarding functionality, availability, system state, event schedules, blocking schedules, and the like, related to a particular system. In some embodiments, the forecast engine may collect system specific data 240 from some or all of the systems in a particular development environment 100 before a request from a user is received. In such embodiments, the forecast engine may store the collected system specific data 240 in a repository associated with the development environment 100. The information stored in the repository may be updated periodically to ensure the most updated system specific information 240 is available. Accordingly, the forecast engine may update the repository any time it receives notification that one or more of the systems in the development engine 100 has updated or changed it system specific information 240.

Figure 3:
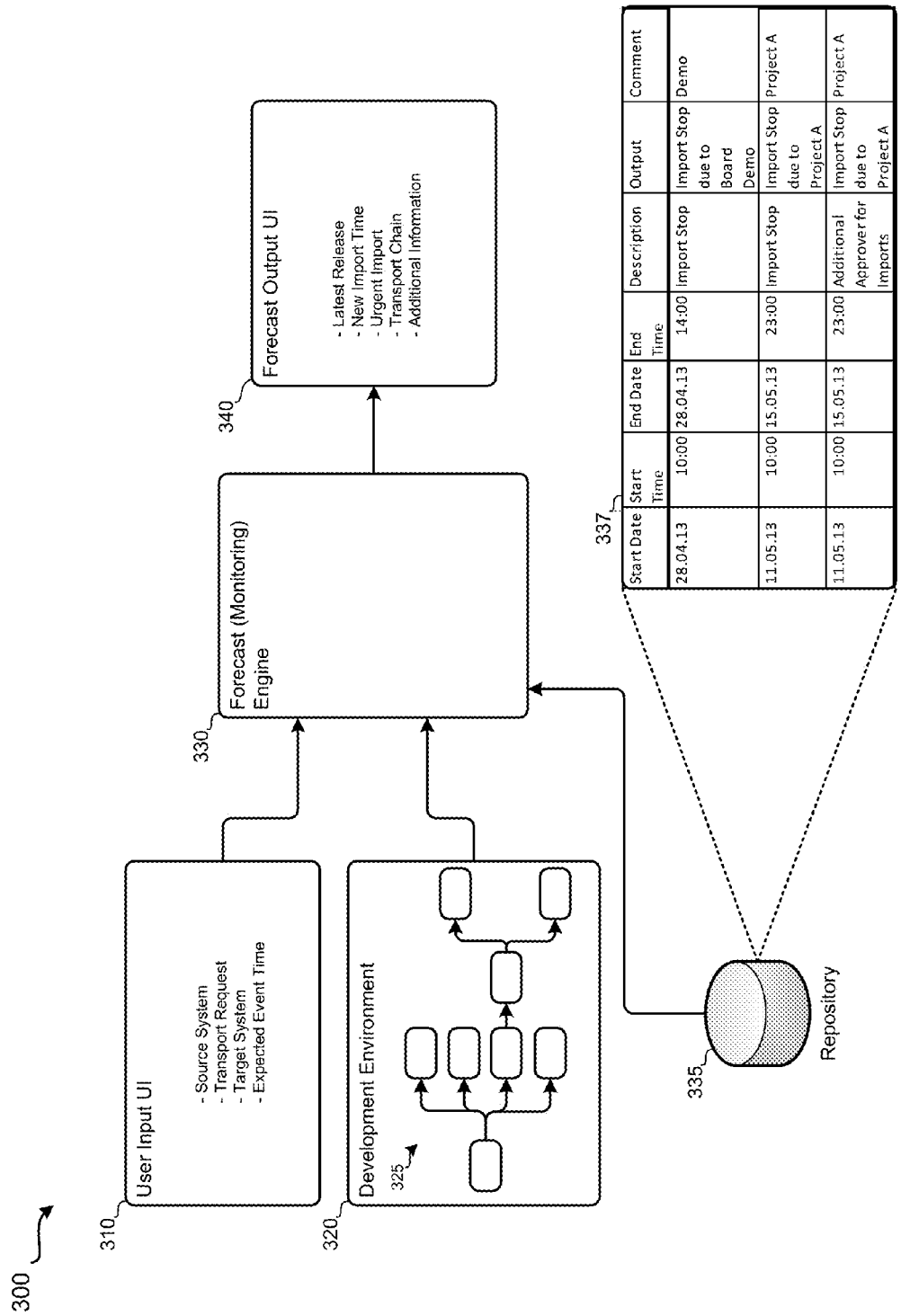
FIG. 3 is a system diagram that includes a forecast engine coupled to a multisystem software development environment, according to various embodiments of the present disclosure.

FIG. 3 is a block diagram of an example system 300 for forecasting object code release times, according to various embodiments of the present disclosure. As shown, system 300 includes a forecast engine 330 coupled to user input UI 310, development environment 320, and repository 335. Each of the components of the system 300 may be executed in one or more computer systems in communication with one another through one or more electronic communication media using one or more electronic communication protocols.

The forecast engine 330 may receive a request for event schedule data through the user input UI 310. In one embodiment, the forecast engine 330 may include and/or generate the user input UI 310 in response to a request from a development system 110 being used to compose or generate one or more pieces of object code. The user input UI 310 may include a graphical user interface (GUI) that includes controls, such as data fields, radio buttons, sliders, pull-down menus, and the like, to accept input from a user. The input may include a source system identifier, a transport request identifier, target system identifiers, and, optionally, an expected event time. The expected event time may represent a particular target event in which the user (i.e., the developer) wishes his object code to be included.

In response to the request for event schedule data, the forecast engine 330 retrieves the transport layer definition 325 from the particular development environment 320 in which the specified source system and target system reside. Based on the information in the request and transport layer definition 325, the forecast engine may map one or more possible transport chains by which to deliver object code generated or processed in the source system to the target system. The transport chain may include a definition of multiple systems and the manner in which they are connected to one another within the transport layer definition 325. In one embodiment, forecast engine 330 may retrieve system specific data directly from the systems specified in the transport chain. Alternatively, the forecast engine 330 may retrieve event schedule information for the systems specified in the transport chain from the repository 335. Event schedule information stored in the repository 335 may be in the form of a table 337. The table 337 may include event specific information, such as start date, start time, end date, end time, event descriptions, event output descriptions, comments, and the like.

The forecast engine 330, based on the request for event schedule data, the transport layer definition 325, and any information received from the repository 335, may generate the forecast output UI 340. While the repository 335 is shown as being separate from the forecast engine 330, the repository 335 may be included in or be part of the forecast engine 330.

The forecast engine 330 may include and/or generate the forecast output UI 340 in a GUI provided by the source system. The forecast output UI 340 may include event schedule information, such as the latest release time from the source system, next import time for the target system, indications of urgent input procedures, specifications of a specific transport chain, and any other additional information generated or determined from information retrieved and analyzed by the forecast engine 330.

Figure 4:
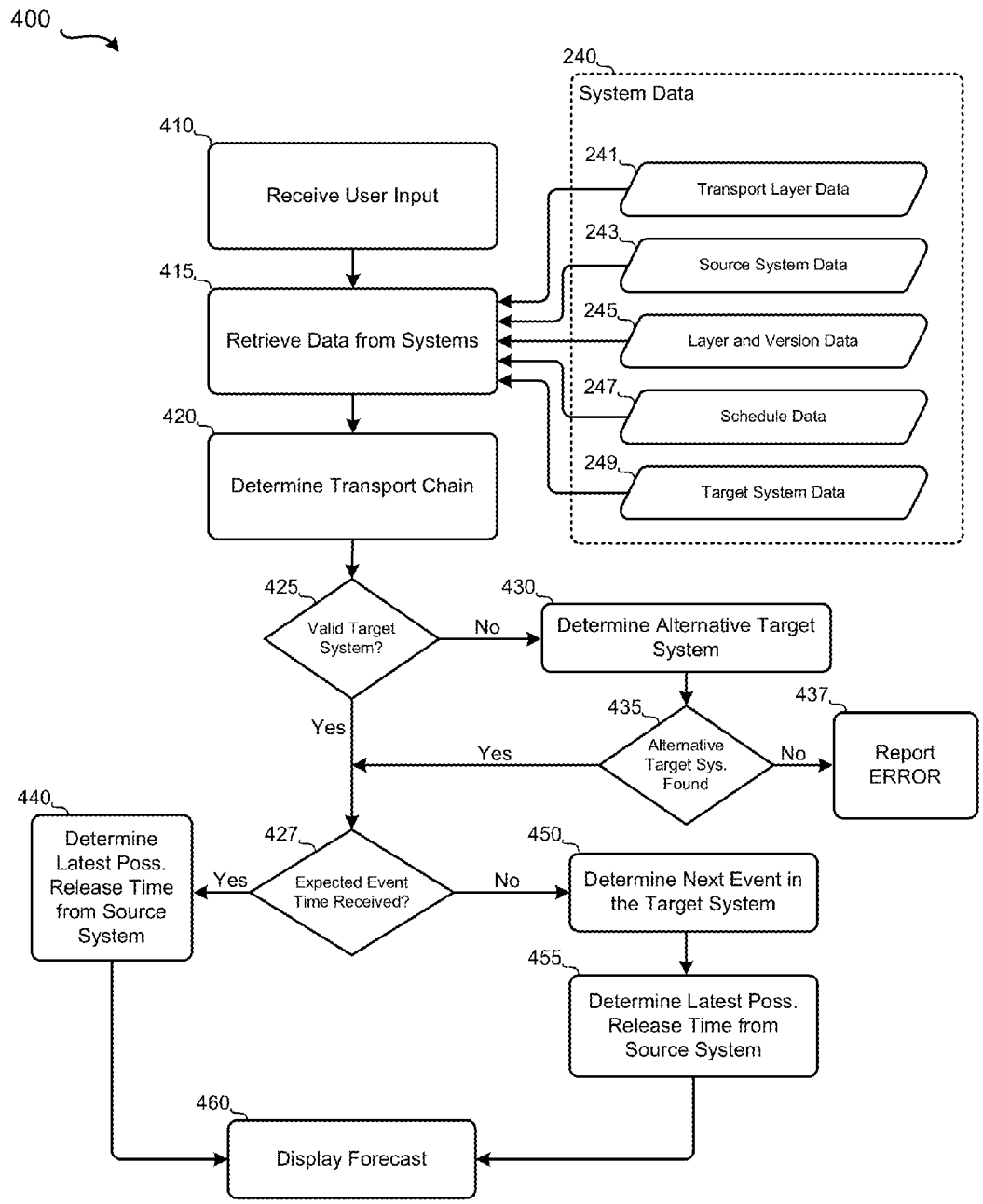
FIG. 4 is a flowchart of a method for determining event schedule data in a multisystem software development environment, according to various embodiments of the present disclosure.

FIG. 4 is a flowchart of a method 400 for forecasting event schedule data. Method 400 may begin at action 410, in which the forecast engine 330 receives user input. User input may be in the form of a request for event schedule information received through a GUI generated by a development system 110 or the forecast engine 330. As discussed herein, request for event schedule information may include various information from which the forecast engine 330 can determine a particular development environment 320. Based on the request, the forecast engine 330 may retrieve system specific data 240 for one or more systems in the development environment 320. The system specific data 240 may be retrieved either directly from the systems in the development environment 320, or it may be retrieved from one or more tables 337 stored in repository 335.

The system specific data 240 may include transport layer data 241 that defines where in a transport layer definition 325 a particular system is disposed. The definition of where a particular system is disposed in the transport layer definition 325 can be specified relative to other systems and transport mechanisms in the transport layer definition 325. Accordingly, the transport layer data 241 can specify if the particular system is located in an early or late stage of the transport layer definition 325.

In some embodiments, system specific data 240 may also include source system data 243 that specifies the functionality particular to the source system. For example the source system data 243 may include specifications that indicate the configuration of the system or the type of object code that the source system can generate. In addition, the system specific data 240 may also include layer and version data 245 that specifies the state and type of the object code associated with a particular system. The state information may include specifications of the version, such as a version number, of the object code, while the type of the object code may include indications of where the object code fits into a particular final composite object code or application. For example, the type may indicate that the object code generated in the system belongs in a UI layer or in a backend analysis layer.

In one embodiment, schedule data 247 may also be included in the system specific data 240. For example, the schedule data 247 may include a schedule of singular or periodic release or export events associated with transport requests that can deliver object code generated by the source system to one or more other systems.

In other embodiments, the system specific data 240 may include target system data 249. As discussed herein, the target system data 249 may include any information regarding the functionality, position, and events schedules associated with the target system and/or the development environment 320 in which is located. For example, the target system data 249 may include a schedule of start and stop times for particular development tasks, as well as blocking periods during which the target system will not accept object code from other systems in the development environment.

In response to the system specific data 240 and the request, the forecast engine 330 can determine a transport chain within the transport layer definition 325 that can be used to transport object code generated by source system to the target system. To determine the transport chain, the forecast engine may analyze the transport layer definition 325 to map a path through multiple systems and transport mechanisms from the source system to the target system.

In determination 425, the forecast engine 330 may validate the target system. Validating the target system may include determining whether the transport chain is able to deliver object code from the source system to the target system. If the forecast engine 330 determines that the target system is not valid, then the forecast engine 330 may determine an alternative target system in action 430. Determining alternative target system may include selecting a different path through the systems in the transport layer definition to generate a new transport chain. If no alternative target system is determined in action 435, then the forecast engine 330 can report an error in action 437. If however, the forecast engine 330 does find an alternative target system, the method 400 can use the alternative target system and proceed to determination 430.

Alternatively, if the forecast engine 330 determines that the target system is valid in determination 425, thus foregoing actions 430 and 435, then the forecast engine 330 may determine whether an expected event time was received with the request for event schedule data, in determination 427. To determine whether an expected event time was received can include checking a data field in the user input UI 310. In some embodiments, determining whether an expected event time was received may include referencing the schedule data associated with the target system to check for a matching scheduled event. If in determination 427 forecast engine 330 determines that an expected event time was received, then the forecast engine 330 can analyze the transport chain to determine the amount of time needed for object code to traverse the transport chain between the source system and the target system, in action 440. The time required for object code to traverse the transport chain may be determined by analyzing event schedules for each one of the systems in the event chain, and their interactions with one another. By working backwards from the expected event time, the forecast engine 330 may then determine the latest possible time by which object code must be released from the source system.

However, if the forecast engine 330 in determination 427 finds that no expected event time was received, then the forecast engine 330 can determine the next event, such as an import event, that will occur in the target system, in action 450. Determining the next event may include analyzing the system specific data 240 to determine an event schedule associated with the target system. Based on the time of the next event in the target system, the forecast engine 330 may determine the latest possible release time from the source system that object code from the source system must be released in order to reach the target system by the time of the next event, in action 455.

Figure 5:
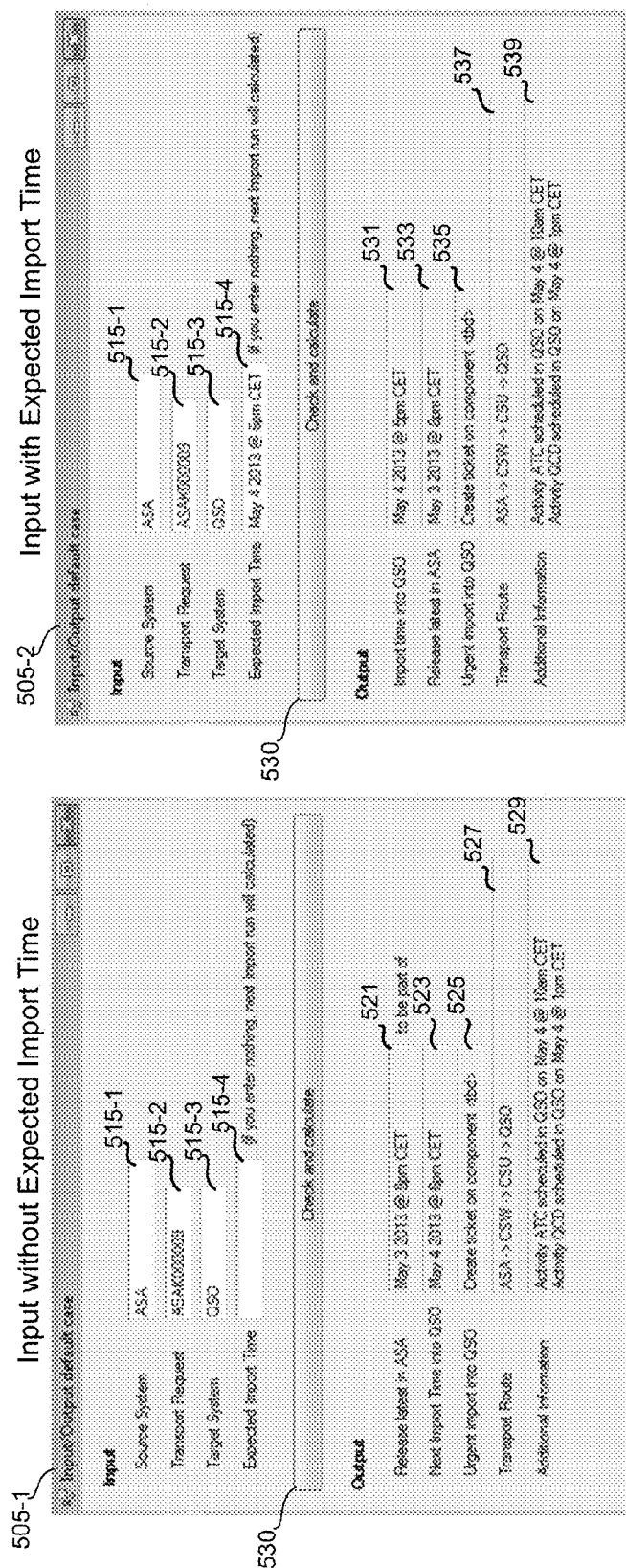
FIG. 5 is an example user interface for requesting and receiving event schedule data for a multisystem software development environment, according to various embodiments of the present disclosure.

In some embodiments, the forecast engine 330 can display the forecast release time by which the object code must be released from the source system in order to reach the target system in time for the next or expected event. In some embodiments, displaying the forecast release time may include generating output and displaying it in a GUI, like those illustrated in FIG. 5.

GUIs 505-1 and 505-2 include controls 515 for a user to enter specifications of a request for event schedule data. For example, both GUIs 500 include data fields for entering source system identifiers, transport request identifiers, target system identifiers, and an optional expected event (import) time. The GUIs 505 may also include buttons, such as button 530 to generate a request for event schedule data based on the user input and to initiate various processes of the forecast engine 330, such as the actions described in reference to the method 400 depicted in FIG. 4.

In response to the request for event schedule data, the forecast engine 330 may generate event schedule data. For example, in some embodiments in which the request does not include an expected event time, GUI 505-1 may include output fields for displaying the latest release time from the source system 521, the next event (import) time into the target system 523, instructions or controls for generating an urgent event (import) into the target system 525, indications of the proposed transport chain 527, and additional information 529 that may list future events in the source or target systems. In other embodiments, in which the request does include an expected event (import) time, the GUI 505-2 may include output fields for displaying the specified event (import) time into the target system 531, the latest release time from the source system 533, instructions or controls for generating an urgent event (import) into the target system 535, indications of the proposed transport chain 537, and additional information 539.

Figure 6:
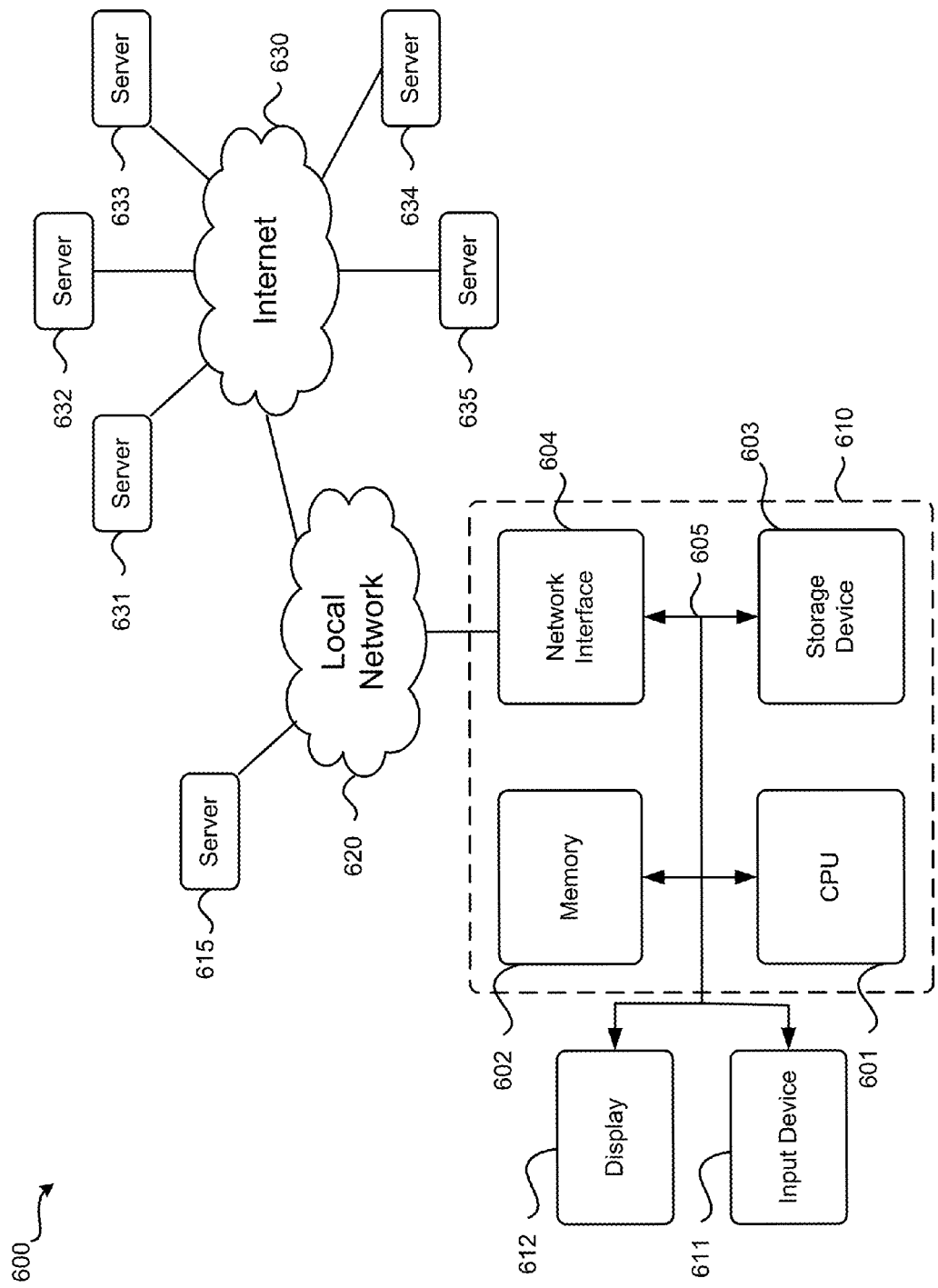
FIG. 6 is an example computer system and network that can be used implement various embodiments of the present disclosure.

FIG. 6 illustrates an example computer system and networks that may be used to implement embodiments of the present disclosure. Computer system 610 includes a bus 605 or other communication mechanism for communicating information, and a processor 601 coupled with bus 605 for processing information. Computer system 610 also includes a memory 602 coupled to bus 605 for storing information and instructions to be executed by processor 601, including instructions for performing the techniques described above. This memory may also be used for storing temporary variables or other intermediate information during execution of instructions to be executed by processor 601. Possible implementations of this memory may be, but are not limited to, random access memory (RAM), read only memory (ROM), or both. A storage device 603 is also provided for storing information and instructions. The information instructions can be in the form of computer readable code stored on the storage device, accessible and executable by processor to implement various techniques and methods of the present disclosure. Common forms of storage devices include non-transient, non-volatile computer readable media, for example, a hard drive, a magnetic disk, an optical disk, a CD, a DVD, a flash memory, a USB memory card, or any other medium from which a computer can read.

Computer system 610 may be coupled via the same or different information bus, such as bus 605, to a display 612, such as a cathode ray tube (CRT), touchscreen, or liquid crystal display (LCD), for displaying information. An input device 611 such as a keyboard and/or mouse is coupled to a bus for communicating information and command selections from the user to processor 601. The combination of these components allows the user to communicate with the system.

Computer system 610 also includes a network interface 604 coupled with bus 605. Network interface 604 may provide two-way data communication between computer system 610 and the local network 620. The network interface 604 may be a digital subscriber line (DSL) or a modem to provide data communication connection over a telephone line, for example. Another example of the network interface is a local area network (LAN) card to provide a data communication connection to a compatible LAN. Wireless links is also another example. In any such implementation, network interface 604 sends and receives electrical, electromagnetic, or optical signals that carry digital data streams representing various types of information.

Computer system 610 can send and receive information, including messages or other interface actions, through the network interface 604 to an Intranet or the Internet 630. In the Internet example, software components or services may distributed across multiple different computer systems 610 or servers 631 across the network. Software components described above may be implemented on one or more servers. A server 631 may transmit messages from one component, through Internet 630, local network 620, and network interface 604 to a component or container on computer system 610, for example. Software components of a composite application may be implemented on the same system as other components, or on a different machine than other software components. This process of sending and receiving information between software components or one or more containers may be applied to communication between computer system 610 and any of the servers 631 to 635 in either direction. It may also be applied to communication between any two servers 631 to 635.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method comprising:
   receiving, by a computer system, a request for event schedule data for a software development environment comprising a plurality of systems;
   retrieving, by the computer system, system-specific data associated with each system in the plurality of systems;
   determining, by the computer system, a source system in the plurality systems and a target system in the plurality of systems based on the request, wherein the source system comprises a development system configured to generate component object code released and the target system comprises another system in the plurality of systems configured to compile the component object code into composite object code:
   retrieving, by the computer system, a transport layer definition that defines ordered connections specifying a plurality of connections among the plurality of systems and how object code is distributed among the plurality of systems in the software development environment through the connections;
   determining, by the computer system, a transport path for transporting the component object code from the source system to the target system through the plurality of connections among the plurality of systems based on the transport layer definition;
   generating, by the computer system, a time designation for releasing the component object code from the source system for transport to the target system along the transport path; and automatically delivering, by the computer system, the component object code from the source system to the target system according to the time designation using the determined transport path.

2. The method of claim 1, wherein the plurality of systems comprises a plurality of transport hub systems for coordinating the transport of object code among the plurality of systems, and wherein determining the transport path comprises determining a plurality of object release schedules that define to which other systems in the plurality of systems and when corresponding transport hub systems release object code.

3. The method of claim 1, wherein the plurality of systems comprises a plurality of test systems for testing the functionality of object code, and wherein determining the transport path comprises determining a plurality of testing schedules that define when corresponding test systems test object code.

4. The method of claim 1, wherein determining the transport path comprises determining blocking periods during which corresponding systems in the plurality of systems block transporting object code from other systems in the plurality of systems.

5. The method of claim 1, wherein the request for event schedule data comprises a target event in the target system, and wherein determining the transport path comprises determining the latest possible release time of the component object code from the source system for the component object code to reach the target system in time for the target event.

6. The method of claim 1, wherein determining the transport path comprises determining the latest possible release time of the component object code from the source system for the component object code to reach the target system in time for a scheduled event in the target system.

7. The method of claim 6, wherein the target system comprises a testing system and wherein the scheduled event comprises a testing routine.

8. A non-transitory computer readable medium comprising computer readable instructions that when executed by a computer processor cause the computer processor to be configured for:
receiving a request for event schedule data for a software development environment comprising a plurality of systems;
retrieving system-specific data associated with each system in the plurality of systems;
determining a source system in the plurality systems and a target system in the plurality of systems based on the request, wherein the source system comprises a development system configured to generate component object code and the target system comprises another system in the plurality of systems configured to compile the component object code into composite object code;
retrieving a transport layer that defines ordered connections specifying plurality of connections among the plurality of systems and how object code is distributed among the plurality of systems in the software development environment through the connections;
determining a transport path for transporting the component object code from the source system to the target system through the plurality of connections among the plurality of systems based on the transport layer definition;
generating a time designation for releasing the component object code from the source system for transport to the target system along the transport path; and
automatically delivering the component object code from the source system to the target system according to the time designation using the determined transport path.

9. The non-transitory computer readable medium of claim 8, wherein the plurality of systems comprises a plurality of transport hub systems for coordinating the transport of object code among the plurality of systems, and wherein the instructions that cause the processor to be configured for determining the transport path further comprises instructions that cause the processor to be configured for determining a plurality of object release schedules that define to which other systems in the plurality of systems and when corresponding transport hub systems release object code.

10. The non-transitory computer readable medium of claim 8, wherein the plurality of systems comprises a plurality of test systems for testing the functionality of object code, and wherein the instructions that cause the processor to be configured for determining the transport path further comprise instructions that cause the processor to be configured for determining a plurality of testing schedules that define when corresponding test systems test object code.

11. The non-transitory computer readable medium of claim 8, wherein the instructions that cause the processor to be configured for determining the transport path further comprise instructions that cause the processor to be configured for determining blocking periods during which corresponding systems in the plurality of systems block transporting object code from other systems in the plurality of systems.

12. The non-transitory computer readable medium of claim 8, wherein the request for event schedule data comprises a target event in the target system, and wherein the instructions that cause the processor to be configured for determining the transport path further comprise instructions that cause the processor to be configured for determining the latest possible release time of the component object code from the source system for the component object code to reach the target system in time for the target event.

13. The non-transitory computer readable medium of claim 8, wherein the instructions that cause the processor to be configured for determining the transport path further comprise instructions that cause the processor to be configured for determining the latest possible release time of the component object code from the source system for the component object code to reach the target system in time for a scheduled event in the target system.

14. The non-transitory computer readable medium of claim 13, wherein the target system comprises a testing system and wherein the scheduled event comprises a testing routine.

15. A system comprising:
a computer processor; and
a non-transitory computer readable medium coupled to the processor and comprising instructions, that when executed by the computer processor cause the computer processor to be configured to:
receive a request for event schedule data for a software development environment comprising a plurality of systems;
retrieve system-specific data associated with each system in the plurality of systems;
determine a source system in the plurality systems and a target system in the plurality of systems based on the request, wherein the source system comprises a development system configured to generate component object code and the target system comprises another system in the plurality of systems configured to compile the component object code into composite object code:

retrieving a transport layer definition that defines ordered connections specifying a plurality of connections among the plurality of systems and how object code is distributed among the plurality of systems in the software development environment through the connections;

determine a transport path for transporting the component object code from the source system to the target system through the plurality of connections among the plurality of systems based on the transport layer definition;

generate a time designation for releasing the component object code from the source system for transport to the target system along the transport path; and automatically deliver the component object code from the source system to the target system according to the time designation using the determined transport path.

16. The system of claim 15, wherein the plurality of systems comprises a plurality of transport hub systems for coordinating the transport of object code among the plurality of systems, and wherein the instructions that cause the processor to be configured to determine the transport path further comprises instructions that cause the processor to be configured to determine a plurality of object release schedules that define to which other systems in the plurality of systems and when corresponding transport hub systems release object code.

17. The system of claim 15, wherein the plurality of systems comprises a plurality of test systems for testing the functionality of object code, and wherein the instructions that cause the processor to be configured to determine the transport further comprise instructions that cause the processor to be configured to determine a plurality of testing schedules that define when corresponding test systems test object code.

18. The system of claim 15, wherein the instructions that cause the processor to be configured to determine the transport further comprise instructions that cause the processor to be configured to determine blocking periods during which corresponding systems in the plurality of systems block transporting object code from other systems in the plurality of systems.

19. The system of claim 15, wherein the request for event schedule data comprises a target event in the target system, and wherein the instructions that cause the processor to be configured to determine the transport path further comprise instructions that cause the processor to be configured to determine the latest possible release time of the component object code from the source system for the component object code to reach the target system in time for the target event.

20. The system of claim 15, wherein the instructions that cause the processor to be configured to determine the transport path further comprise instructions that cause the processor to be configured to determine the latest possible release time of the component object code from the source system for the component object code to reach the target system in time for a scheduled event in the target system.

* * * * *